(12) United States Patent
Hollis

(10) Patent No.: US 9,696,110 B2
(45) Date of Patent: Jul. 4, 2017

(54) FIREARM SUPPORT BRACE

(71) Applicant: Daniel Hollis, Redmond, WA (US)

(72) Inventor: Daniel Hollis, Redmond, WA (US)

(\*) Notice: Subject to any disclaimer, the term of this patent is extended or adjusted under 35 U.S.C. 154(b) by 0 days.

(21) Appl. No.: 15/069,003

(22) Filed: Mar. 14, 2016

(65) Prior Publication Data

US 2016/0282084 A1 Sep. 29, 2016

Related U.S. Application Data

(60) Provisional application No. 62/138,169, filed on Mar. 25, 2015.

(51) Int. Cl.
*F41C 23/12* (2006.01)
*F41C 33/00* (2006.01)
*F41C 23/14* (2006.01)
*F16M 13/04* (2006.01)

(52) U.S. Cl.
CPC .............. *F41C 23/12* (2013.01); *F41C 23/14* (2013.01); *F41C 33/001* (2013.01); *F16M 13/04* (2013.01)

(58) Field of Classification Search
CPC ...... A61F 5/013; A61F 5/3723–5/3761; F16M 13/00; F16M 13/04; F41C 33/001; F41C 27/00; F41C 23/06; F41C 23/12; F41C 23/04; F41C 23/14; F41A 23/04–23/06; F41A 23/08
USPC ........................................................ D22/108
See application file for complete search history.

(56) References Cited

U.S. PATENT DOCUMENTS

| 1,569,901 | A | * | 1/1926 | Virdin | F41C 23/00 42/72 |
| 2,441,487 | A | * | 5/1948 | Howard | F41C 23/04 42/72 |
| 3,200,528 | A | * | 8/1965 | Christensen | F41C 23/12 224/185 |
| 4,241,731 | A | * | 12/1980 | Pauley | A61F 5/3753 602/4 |

(Continued)

OTHER PUBLICATIONS

Midwayusa, Inc., "Sig Sauer SB-15 Pistol Stabilizing Brace AR-15," http://www.midwayusa.com/product/2139134646/sig-sauer-sb-15-pistol-stabilizing-brace-ar-15, (c) 2016, Accessed Feb. 18, 2016.

(Continued)

*Primary Examiner* — Stephen M Johnson
*Assistant Examiner* — Joshua Semick
(74) *Attorney, Agent, or Firm* — Bennet K. Langlotz; Langlotz Patent & Trademark Works, Inc.

(57) ABSTRACT

A firearm support brace has an attachment facility operable to removably connect securely to the mounting portion, an arm extending downwardly and rearwardly from the mounting portion, an extension extending from the arm and having an end away from the arm, and a saddle element connected to the end of the extension, such that the firearm is stabilized by positioning the saddle against the upper arm of a user adjacent to the elbow of the user while the barrel is aligned for sighting by the user. The attachment facility may include a first clamp portion connected to the arm, and a second portion removably connected to the first clamp portion. The attachment facility may define a cylindrical aperture. The attachment facility may be rotatable with respect to the firearm about a rotation axis parallel to a barrel axis defined by the barrel.

19 Claims, 5 Drawing Sheets

(56) References Cited

U.S. PATENT DOCUMENTS

| | | | | |
|---|---|---|---|---|
| 4,296,566 A | * | 10/1981 | Campos | F41C 23/14 42/71.01 |
| 4,674,472 A | * | 6/1987 | Reis | F16M 13/04 124/23.1 |
| 5,180,874 A | * | 1/1993 | Troncoso, Jr. | F41C 33/001 42/71.02 |
| 5,819,461 A | * | 10/1998 | Killian | F16M 13/04 42/94 |
| 6,250,009 B1 | * | 6/2001 | Leontuk | F41A 27/22 42/72 |
| 6,920,713 B1 | * | 7/2005 | Love | F41A 23/04 42/90 |
| 6,976,333 B2 | * | 12/2005 | Sims | F41C 23/08 42/74 |
| 7,065,914 B1 | * | 6/2006 | Wagner, II | F41C 23/04 124/74 |
| D706,896 S | | 6/2014 | Bosco | |
| 8,869,444 B2 | | 10/2014 | Bosco | |
| 9,395,150 B2 | * | 7/2016 | Park | F41C 23/20 |

OTHER PUBLICATIONS

Sig Sauer, Inc., "SBX Pistol Stabilizing Brace," http://store.sigsauer.com/sbx-pistol-stabilizing-brace-7466.html, (c) 2015, Accessed Feb. 18, 2016.

Shockwave Technologies, "Shockwave Blade Pistol Stabilizer, Black $48.95," http://shockwavetechnologies.com/site/?page_id=1970, Accessed Mar. 7, 2016.

FAB LTD., "KPOS G2 LB-200," http://www.fab-defense.com/en/category-pistol-to-carbine-conversion-kit/id-717/ultimate-handgun-support-system-.html, Accessed Mar. 7, 2016.

Steve Johnson, "Mako KPOS G2 LB200 'Handgun Support System'," http://www.thefirearmblog.com/blog/2013/02/05/mako-kpos-g2-lb200-handgun-support-system/, Feb. 5, 2013, Accessed Mar. 7, 2016.

* cited by examiner

FIREARM SUPPORT BRACE

CROSS-REFERENCE TO RELATED APPLICATION

This application claims the benefit of U.S. Provisional Patent Application No. 62/138,169 filed on Mar. 25, 2015, entitled "UPPER ARM SUPPORTED HANDGUN ASSEMBLY," which is hereby incorporated by reference in its entirety for all that is taught and disclosed therein.

FIELD OF THE INVENTION

The present invention relates to firearms, and more particularly to a firearm support brace that supports and stabilizes a pistol with the user's upper arm.

BACKGROUND OF THE INVENTION

Pistols are firearms that do not have a shoulder stock and are designed to be operated with one hand (18 U.S.C., §921(A)(29) and 27 CFR §478.11). Since the National Firearms Act (NFA) was passed in 1934, ownership of rifles with barrels shorter than 16 inches ("short barreled rifle"), or smoothbore firearms with barrels shorter than 18 inches ("short barreled shotgun"), has necessitated extensive paperwork, a long processing period, and a $200 tax. Crossing state lines with a firearm subject to the NFA also requires paperwork and a notification to the federal government in advance of the trip. Pistols based on rifles such as the AR-15 ("AR-15 Pistol") provide some of the advantages of short barreled rifles but are not subject to NFA restrictions. The disadvantage of such pistols compared to a short barreled rifle is the absence of a shoulder stock to provide stability. Such pistols tend to be relatively large and heavy, they can be difficult to shoot accurately and can quickly tire the user.

One prior art approach to addressing the difficulty of stabilizing pistols is the SB15 Pistol Stabilizing Brace manufactured by Sig Sauer, Inc. of Newington, N.H. The brace uses the operator's forearm to provide stable support via a flexible cuff with two adjustable nylon straps. One disadvantage is the inconvenience of having to strap the flexible cuff onto the user's forearm prior to being able to shoot the firearm, and having to unstrap the flexible cuff from the user's forearm prior to being able to put down the firearm. Second, proper eye relief for use with optics or iron sights may be extremely difficult or impossible. Third, the resemblance of the brace to a conventional shoulder stock creates the temptation for users to use the brace to stabilize the pistol against the user's shoulder. The Firearms and Ammunition Technology Division of the Bureau of Alcohol, Tobacco, Firearms and Explosives issued an open letter on Jan. 16, 2015 stating that using the brace as a shoulder stock constitutes a "redesign" of the device, and would therefore subject the user to the requirements of the NFA. Therefore, using the brace to stabilize the pistol against the user's shoulder is illegal.

A subsequent prior art approach that also addresses the difficulty of stabilizing pistols is the SBX Pistol Stabilizing Brace manufactured by Sig Sauer, Inc. of Newington, N.H. While this brace has a reduced resemblance to a conventional shoulder stock relative to the SB15 brace, the SBX brace continues to have the inconvenience of having to strap the flexible cuff onto the user's forearm prior to being able to shoot the firearm, and having to unstrapped the flexible cuff from the user's forearm prior to being able to put down the firearm.

Another prior art approach is the Shockwave Blade Pistol Stabilizer manufactured by Shockwave Technologies of Salt Lake City, Utah. Instead of a cuff that slips over the user's forearm, the Shockwave Blade uses a vertical blade, and the user straps their forearm against the side of the vertical blade. The Shockwave Blade has the same drawbacks as the Sig Sauer braces in that, although it may be somewhat easier to put on than the Sig Sauer braces as it does not require the cuff around the user's forearm, it still requires straps.

Another prior art approach is the FAB Defense KPOS G2 LB-200 manufactured by FAB Ltd. of Israel, which appears to transfer recoil forces to additional muscle groups, but otherwise does little to stabilize the attached pistol.

None of the prior art devices described above allow for proper eye relief for use with optics or iron sights, which compromises the accuracy achievable with the attached firearm. They also require the firearm to be held out at arm's length, which lengthens the moment arm the weight of the firearm exerts against. This makes the firearm seem heavier and causes more rapid onset of fatigue.

Therefore, a need exists for a new and improved firearm support brace that enables the user to readily pick up and put down an attached firearm. In this regard, the various embodiments of the present invention substantially fulfill at least some of these needs. In this respect, the firearm support brace according to the present invention substantially departs from the conventional concepts and designs of the prior art, and in doing so provides an apparatus primarily developed for the purpose of stabilizing a firearm while enabling the user to readily pick up and put down an attached firearm.

SUMMARY OF THE INVENTION

The present invention provides an improved firearm support brace, and overcomes the above-mentioned disadvantages and drawbacks of the prior art. As such, the general purpose of the present invention, which will be described subsequently in greater detail, is to provide an improved firearm support brace that has all the advantages mentioned above.

To attain this, the preferred embodiment of the present invention essentially comprises an attachment facility operable to removably connect securely to the mounting portion, an arm extending downwardly and rearwardly from the mounting portion, an extension extending from the arm and having an end away from the arm, and a saddle element connected to the end of the extension, such that the firearm is stabilized by positioning the saddle against the upper arm of a user adjacent to the elbow of the user while the barrel is aligned for sighting by the user. The attachment facility may include a first clamp portion connected to the arm, and a second portion removably connected to the first clamp portion. The attachment facility may define a cylindrical aperture. The attachment facility may be rotatable with respect to the firearm about a rotation axis parallel to a barrel axis defined by the barrel. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
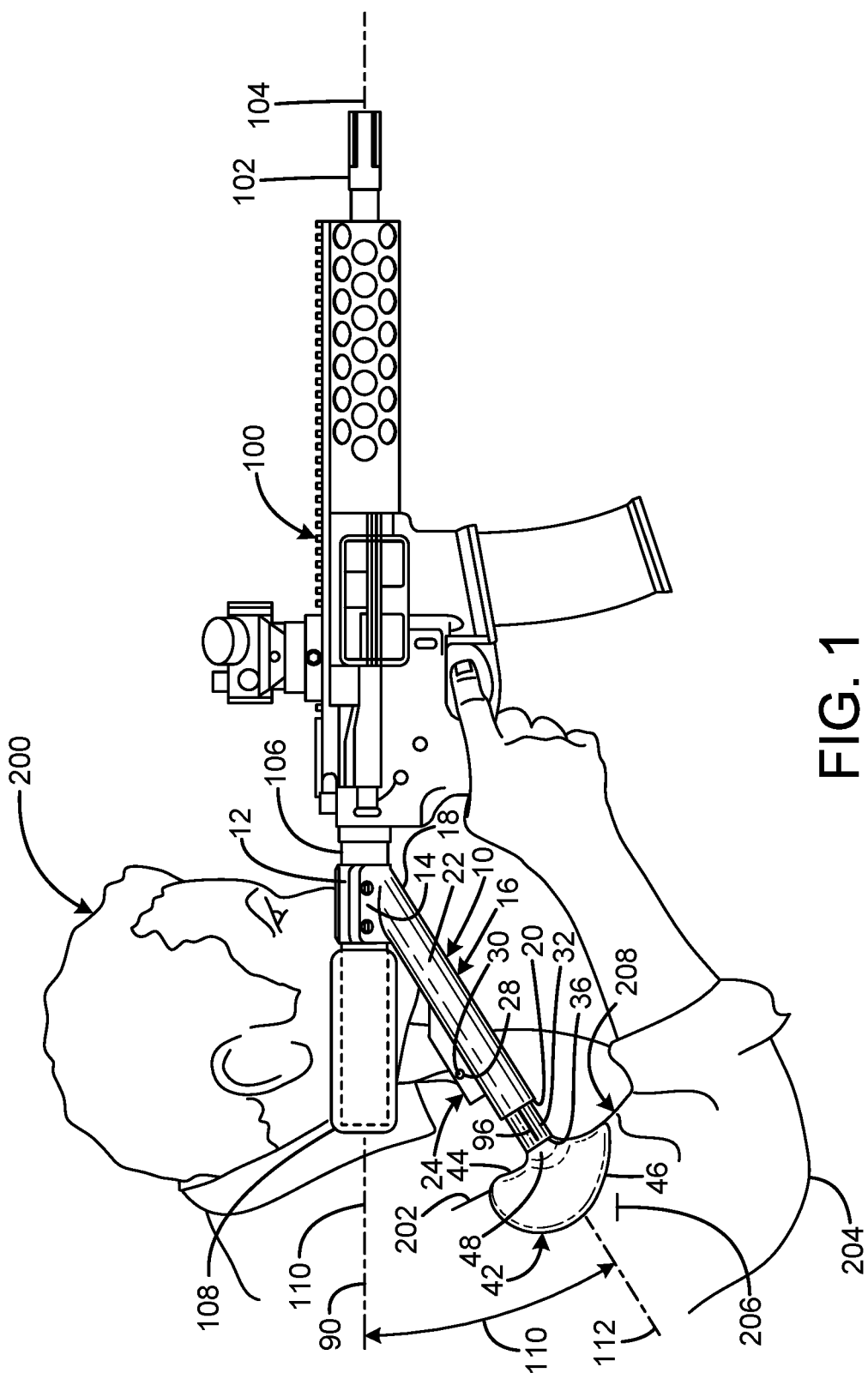
FIG. 1 is a right side view of the current embodiment of the firearm support brace constructed in accordance with the principles of the present invention in use supporting a pistol.

An embodiment of the firearm support brace of the present invention is shown and generally designated by the reference numeral 10.

Figure 2:
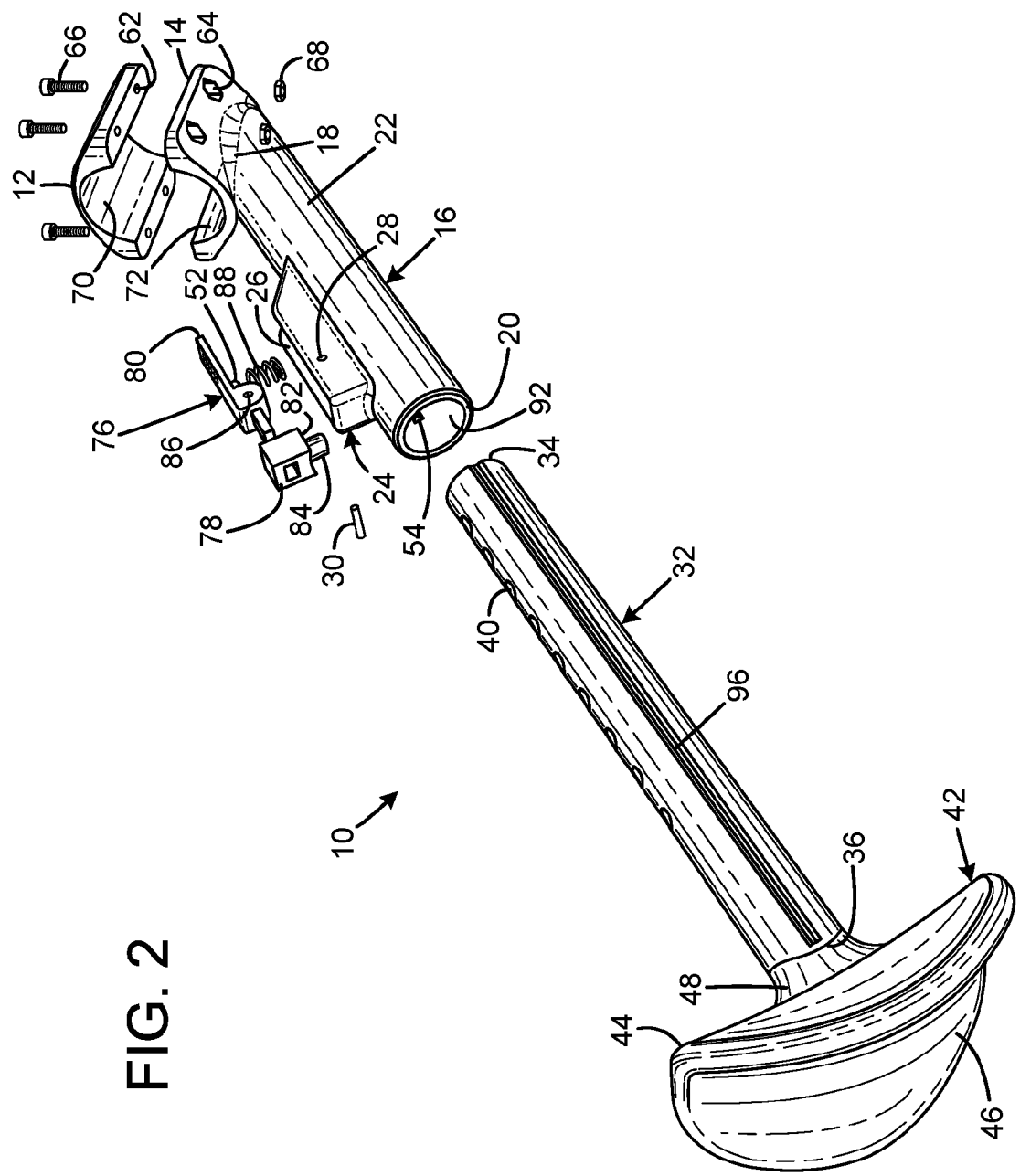
FIG. 2 is an exploded bottom isometric view of the current embodiment of the firearm support brace of FIG. 1.
Figure 3:
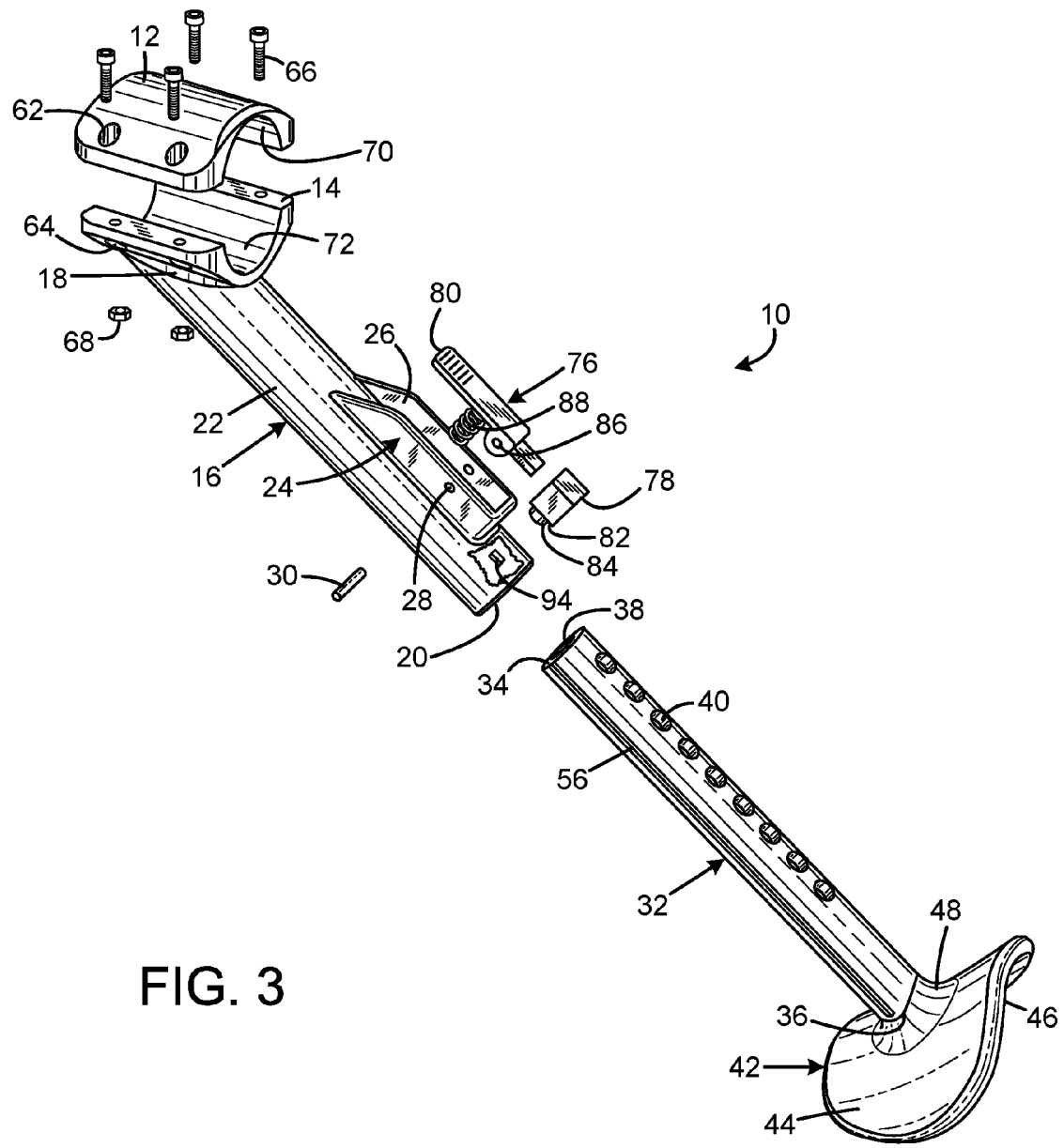
FIG. 3 is an exploded top isometric view of the current embodiment of the firearm support brace of FIG. 1.
Figure 4:
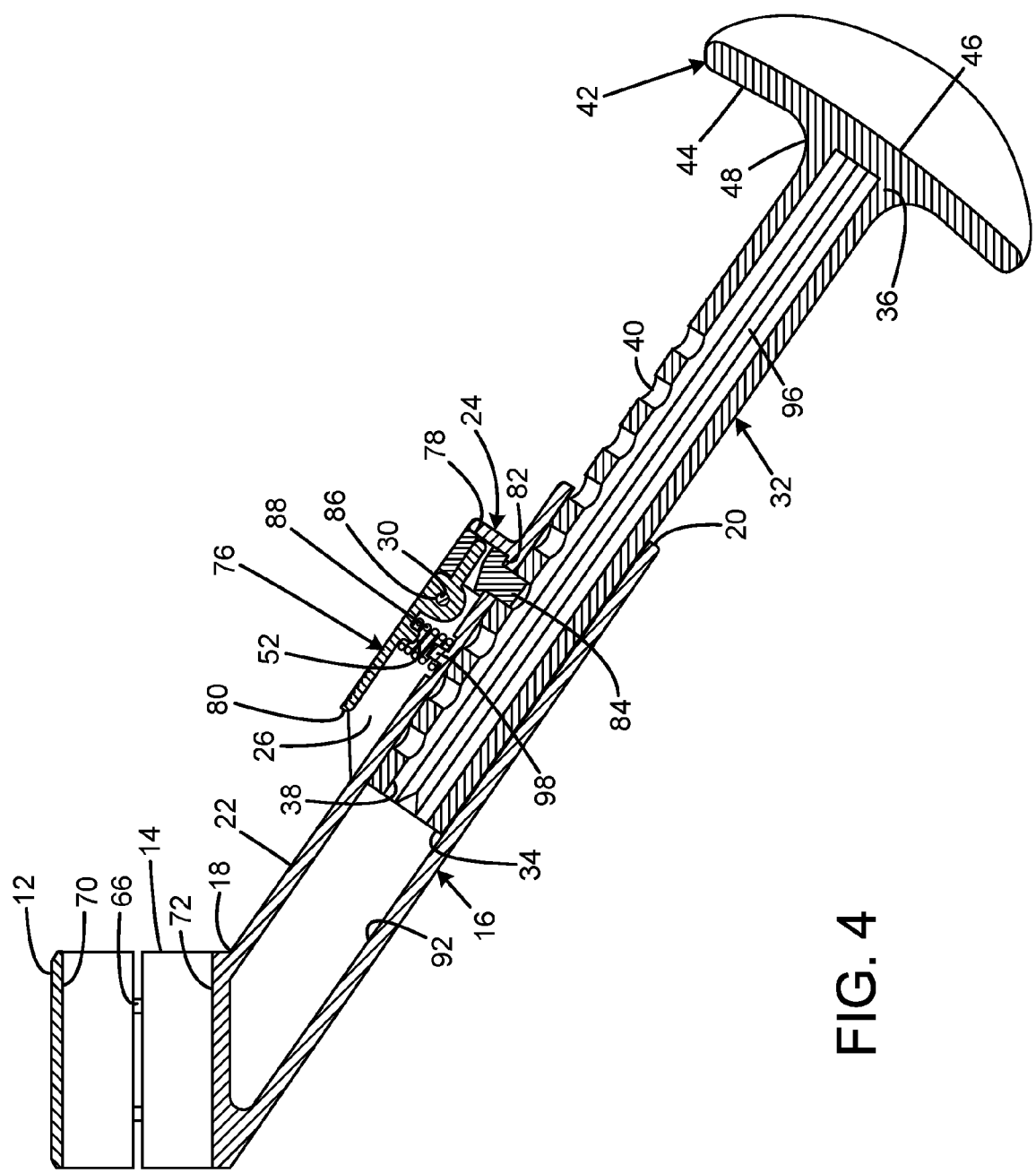
FIG. 4 is a side sectional view of the firearm support brace of FIG. 1.
Figure 5:
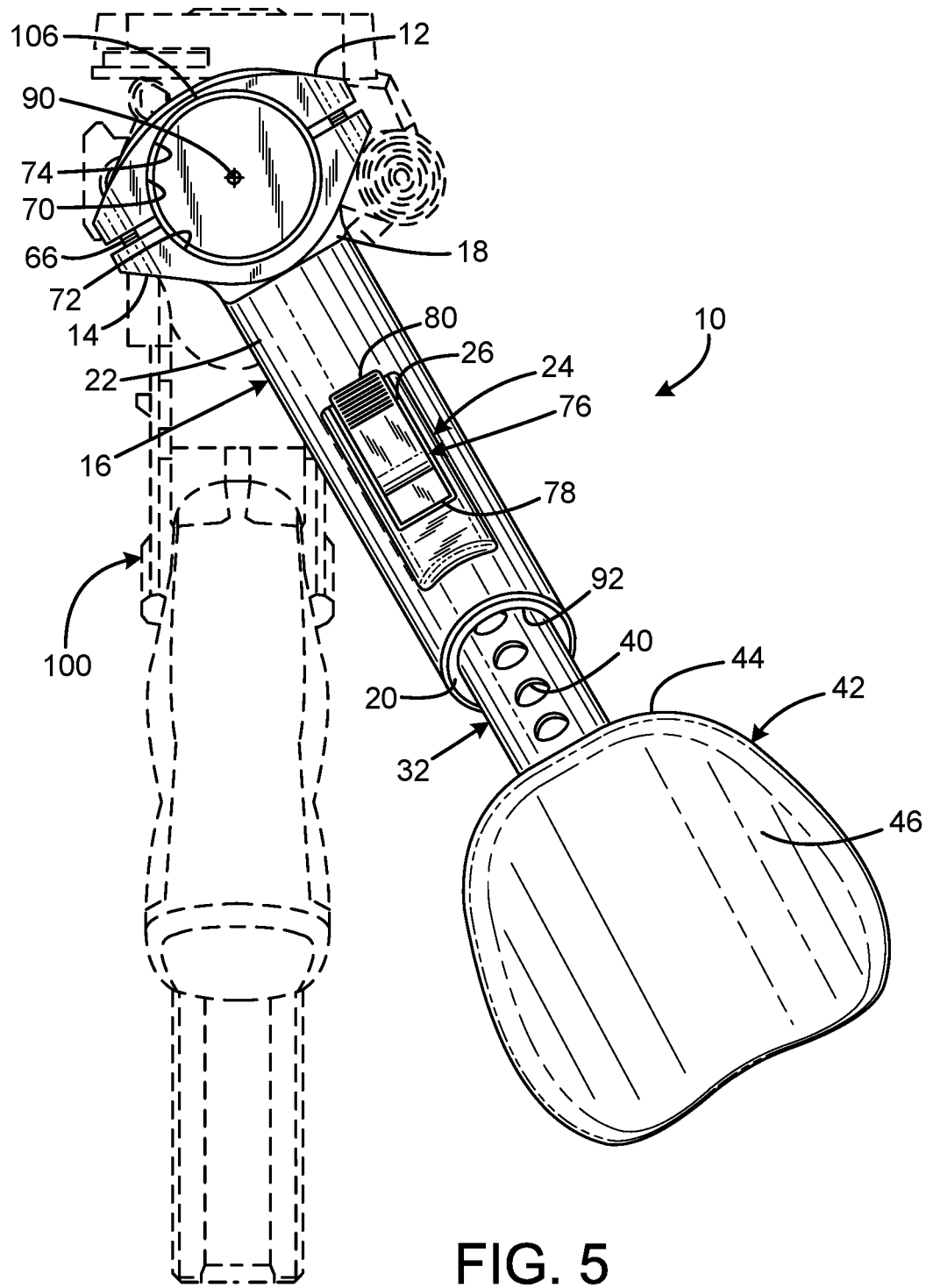
FIG. 5 is a rear view of the firearm support brace of FIG. 1.

FIGS. 1-5 illustrate the improved firearm support brace 10 of the present invention. More particularly, in FIG. 1 the firearm support brace is depicted in use by a shooter 200 supporting a firearm 100, which is an AR-15 pistol in the current embodiment, but can also be any other pistol to which a cylindrical tube may be affixed. The pistol has a barrel 102 that defines a barrel axis 104, a cylindrical buffer tube 106 that defines a tube axis 110, and a foam pad 108 covering the rear portion of the buffer tube.

The firearm support brace 10 has a first clamp portion 12 and a second clamp portion 14 that serve as an attachment facility to connect securely to a mounting portion of the buffer tube 106 that is not covered by the foam pad 108. An arm 16 has a connected end 18 attached to the second clamp portion and an opposed free end 20. The arm extends downwardly and rearwardly from the mounting portion of the buffer tube. The arm extends at an acute angle with respect to the barrel axis, and extends rearwardly and radially away from the barrel axis. The acute angle is preferably 35° from horizontal, and is greater than or equal to 0° and less than or equal to 90°.

The free end 20 of the arm 16 defines a central bore 92 that includes left and right interior antirotation ridges 54, 94. A tubular extension 32 has one end 34 that is telescopically received within the central bore of the arm to provide an adjustable length and an opposed end 36. The extension defines a longitudinal central bore 38, a plurality of adjustment bores 40 that are perpendicular to the central bore 38, and left and right longitudinal slots 56, 96. When the end 34 of the extension is received with the central bore of the arm, the left slot 56 rides on left interior ridge 54 and the right slot 96 rides on right interior ridge 94 to prevent the extension from rotating within the central bore 92.

A saddle element 42 is connected to the end 36 of the extension 32 by a connector 48. The saddle element has a top 44 and a bottom support surface 46 with the connector extending upward from the top. In the current embodiment, the connector extends upward from the top at an 80° angle relative to the extension. However, the connector could also extend upward from the top at a 90° angle relative to the extension. The saddle element is a support element with the bottom support surface facing away from the first and second clamp portions 12, 14. The saddle element is rearward of the first and second clamp portions and radially apart from the tube axis. The saddle element is spaced apart from the tube axis by at least 9 inch (more than the normal drop of the rear corner of shoulder buttstocks). In the current embodiment, the saddle element and extension are manufactured as a unitary body using injection molding or any other suitable manufacturing technique.

The bottom support surface 46 is a major curved surface that is convex in one axis and concave in a perpendicular axis such that it rests comfortably against the lower end (top surface 208 of biceps muscle 206 immediately proximal or above the elbow 204) of the upper arm 202 of a user 200 with limited force concentrations. The brace 10 allows for proper eye relief to permit the use of optics or iron sights to increase accuracy. It also allows the firearm 100 to be held closer to the user's body, reducing the amount of effort required to hold the attached firearm compared to holding out the firearm at arm's length.

The exterior 22 of the arm 16 defines a latch housing 24 with a generally rectangular slot 26. The latch housing defines pivot pin holes 28 that receive a pivot pin 30. The slot receives a latch 76 having a front 78, rear 80, and bottom 82. Pivot pin holes 86 in the latch enable the latch to be pivotally mounted on the pivot pin. A latch pin 84 extends downwardly from the bottom of the latch. A latch spring 88 biases the front of the latch pin downward into the latched position. A spring stud 52 protrudes downwardly from the bottom of the latch to support the latch spring. A spring stud 98 is located within the latch housing on the exterior of the arm to support the latch spring. In the current embodiment, the latch spring is a coil spring.

In the latched position, the latch pin 84 is closely received within one of the adjustment bores 40 of the extension 32 to prevent longitudinal movement of the end 34 of the extension within the central bore 92 of the arm 16. When sufficient downward pressure is exerted on the rear 80 of the latch 76 to overcome the upward pressure exerted by the latch spring 88, the front 78 of the latch pin rises into the unlatched position. In the unlatched position, the latch pin is withdrawn from the adjustment bores of the extension, enabling longitudinal movement of the end 34 of the extension within the central bore of the arm. Longitudinal movement of the extension within the central bore of the arm enables changes to the length of the combined arm and extension, which changes the position of the saddle element 42 relative to the buffer tube 106. The combined length of the arm and extension is adjusted so that it is sufficiently long to support the pistol 100 in a normal position above the upper arm 202 of the shooter 200 when shooting the pistol. In the current embodiment, the combined length of the arm and extension is adjustable between 9 inch and 12.5 inch. However, the adjustment range could be greater than or equal to 4 inch and less than or equal to 16 inch.

The rear end of the buffer tube 106 and the saddle element 42 at the end of the brace 10 are spaced apart from each other, form an acute angle with an open space between them, and each extend rearward of the firearm receiver by a substantial distance. The arm 16 and extension 32 are linear elements aligned with each other on a common axis/connecting line 112. The connecting line is angularly offset from the tube axis 110 by an acute angle, which is 35° from horizontal in the current embodiment. However, the connecting line could be angularly offset from the tube axis by an amount greater than or equal to 0° from horizontal and less than or equal to 90° from horizontal.

The first clamp portion 12 has four apertures 62, and the second clamp portion 14 has four apertures 64 that are axially registered with the aperture 62 when the first and second clamp portions are attached to the buffer tube 106.

Adjustable fasteners in the form of hex bolts 66 and nuts 68 are inserted through the apertures and tightened to secure the first and second clamp portions to the buffer tube. The interiors 70, 72 of the first and second clamp portions define an adjustable cylindrical aperture or bore 74 sized to closely receive the buffer tube. When the adjustable fasteners are sufficiently loose, the first and second clamp portions are placed in the released position that enables the clamp portions to rotate about the buffer tube. The first and second clamp portions rotate about a rotation axis 90 that is parallel to the barrel axis 104 and substantially coincides with the tube axis 110. When the adjustable fasteners are tightened, the first and second clamp portions are placed in the secured position, which prevents rotation. The clamp portions are operable to grip the buffer tube in any angular orientation about the buffer tube. In the current embodiment, the preferred angular orientation ranges from 0° (vertical with the arm extending straight down) to 90° (horizontal with the arm extending to the left or right side).

While a current embodiment of a firearm support brace has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the positions of the clamp portions and the saddle element could be switched such that the clamp portions are attached to the extension and the saddle element is attached to the arm. In addition, the straight buffer tube described could be replaced by a buffer tube with a forward stop. Furthermore, the arm could be an integral part of the buffer tube, thereby eliminating the need for the clamp portions described. Finally, the attachment facility could be in a fixed position on the buffer tube, with the arm being attachable to the attachment facility at various angles.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A firearm with a detachable brace comprising:
   a barrel defining a barrel axis;
   a tubular mounting portion rearward of the barrel and coaxial with the barrel axis;
   a brace comprising:
   an attachment facility defining an aperture coaxial with the barrel axis and operable to removably connect securely to the mounting portion;
   an arm extending rearwardly from the mounting portion and laterally away from the barrel axis;
   an extension extending from the arm and having an end away from the arm; and
   a saddle element connected to the end of the extension, such that the firearm is stabilized by positioning the saddle element against an upper arm of a user adjacent to an elbow of the user while the barrel is aligned for sighting by the user.

2. The firearm with a detachable brace of claim 1 wherein the attachment facility includes a first clamp portion connected to the arm, and a second portion removably connected to the first clamp portion.

3. The firearm with a detachable brace of claim 2 wherein the aperture is cylindrical.

4. The firearm with a detachable brace of claim 1 wherein the attachment facility is rotatable with respect to the firearm about the barrel axis.

5. The firearm with a detachable brace of claim 1 wherein the arm extends at an acute angle with respect to the barrel axis.

6. The firearm with a detachable brace of claim 1 wherein the arm extends at an angle extending rearwardly and radially away from the barrel axis.

7. The firearm with a detachable brace of claim 1 wherein the mounting portion is a cylindrical tube extending opposite the barrel, and wherein the attachment facility is operable to grip the tubular mounting portion in any angular orientation about the tubular mounting portion.

8. The firearm with a detachable brace of claim 1 wherein the extension is telescopically received in an arm bore defined by the arm.

9. The firearm with a detachable brace of claim 1 wherein the arm and extension are linear elements aligned with each other on a common axis.

10. A brace for supporting a firearm having a forward extending barrel defining a barrel axis, and a rearward extending tube having a cylindrical exterior form defining a tube axis coaxial with the barrel axis, the brace comprising:
    an attachment facility defining an adjustable bore sized to closely receive the rearward extending tube;
    the attachment facility having an adjustable fastener operable in a released position to enable the attachment facility to rotate about the rearward extending tube and operable in a tightened position to grip the rearward extending tube and prevent rotation;
    an arm having a first end connected to the attachment facility, and an opposed second end;
    a support element connected to the opposed second end and having a major support surface facing away from the attachment facility.

11. The brace of claim 10 wherein the support element is rearward of the attachment facility and radially apart from the tube axis.

12. The brace of claim 11 wherein the support element is spaced apart from the tube axis by at least 9 inches.

13. The brace of claim 11 wherein the support element and attachment facility define a connecting line, and the connecting line is angularly offset from the tube axis by an angle.

14. The brace of claim 13 wherein the angle is greater than or equal to 0° from the tube axis.

15. The brace of claim 13 wherein the angle is less than or equal to 90° from the tube axis.

16. The brace of claim 10 wherein the support element has a major support surface is a curved surface facing away from the attachment facility.

17. The brace of claim 16 wherein the major curved surface is convex in a first axis and concave in a second axis perpendicular to the first axis such that the major curved surface rests comfortably against a lower end of an upper arm of a user with limited force concentrations.

18. The brace of claim 10 wherein the arm has an adjustable length.

19. The brace of claim 18 wherein the arm has telescoping elements.

\* \* \* \* \*